United States Patent Office 2,874,711
Patented Feb. 24, 1959

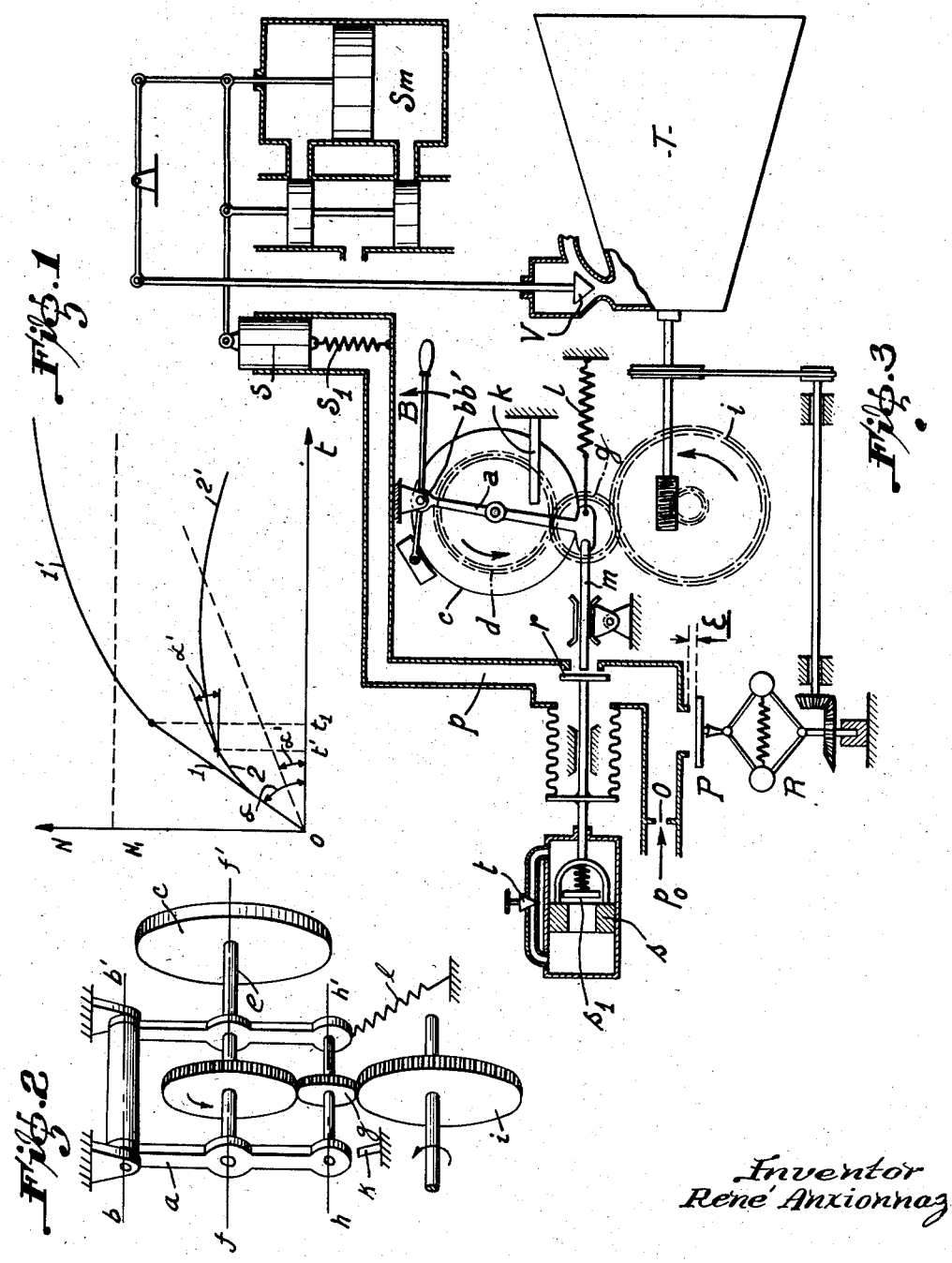

2,874,711

CONTROL OF HIGH-POWER TURBINES

René Anxionnaz, Paris, France, assignor of one-half to Societe Rateau (Societe Anonyme), Paris, France, a company of France Application January 25, 1954, Serial No. 405,806

Claims priority, application France February 4, 1953

3 Claims. (Cl. 137—26)

By reason of the present day development of steam or gas turbines and, in particular, of turbines of large output in a single unit, built for installation in electrical power stations, speed-governing devices are becoming more and more difficult to design and to construct, having regard to the method of construction of the turbines themselves and the limits imposed regarding variations of speed.

In practice, the engine torque at variable speeds is bound up with the moment of inertia of the rotating parts and with the acceleration, by the classical formula:

$$Cm = I \cdot \frac{d\omega}{dt}$$

The engine torque $Cm$ is considerable because of the large power units manufactured at the present time whilst the moment of inertia $I$ of the whole of the rotating parts (turbine and electrical generator which it drives) increases much less rapidly in proportion, than the torque. The result of this is that for large reductions in load and a fortiori in the case of a total removal of the entire load, high angular accelerations may be produced which lead to excessive speeds of the turbine and which the ordinary tachometer speed-control devices can no longer control, so that in such a case the turbine is shut-down by the operation of the safety devices provided for that purpose.

The object of the present invention is to overcome these drawbacks; it consists essentially of a combination of the usual type of tachometer speed-control with a complementary accelerometric control which is designed to act in case of excessive acceleration of the driving machine.

The description which follows below with respect to the attached drawings (which are given by way of example only and not in any sense by way of limitation) will make it quite clear how the invention can be carried into effect, the special features which are referred to, either in the drawings or in the text being understood to form a part of the said invention.

Fig. 1 shows the speed diagram of a high power turbine with tachometric control of speed following a rapid removal of load and the result given by the combined action of an accelerometric speed-control device in accordance with the invention.

Fig. 2 shows diagrammatically one form of embodiment of an acceleration type speed-regulator suitable for carrying the invention into effect.

Fig. 3 shows by way of example and not by limitation the action of the push-rod of the acceleration-type speed regulator on an oil discharge valve of a tachometer speed-control device.

If one considers a high power steam turbine or gas turbine which develops a very high driving torque on full load and on which the load is suddenly reduced, the unit will immediately set up a constant acceleration before the normal tachometer speed-control can come into action to reduce the supply of steam or of gas admitted through the valves. In the diagram of Fig. 1, in which there have been established as abscissae the times and as ordinates the number of revolutions N of the turbine per unit of time, the increase in the speed of rotation will be shown, for this first period, by a straight line 1 passing through the origin of the diagram and whose slope $\alpha$ representing $$\frac{dN}{dt}$$

will increase in value in proportion as the reduction of power becomes greater and the inertia of the rotating masses relatively smaller, such as is the case for modern units of high power for back-pressure turbines comprising a number of stages of small expansion.

As soon as the tachometer speed-control comes into action at the time $t_1$ by reducing the input of steam or of gas, the engine torque diminishes, the angle $\alpha$ decreases in accordance with the closure of the valves and the curve representing the variations of speed bends following the line $l'$ so as to become associated, either asymptotically or following a series of damped oscillations, with a new value of equilibrium.

It can be conceived that for a total off-loading of the turbine and for a relatively low value of inertia of the rotating parts, the angle of slope $\alpha$ can assume large values, and that the curve representing the evolution can go beyond the limiting speed of rotation $N_1$ which has been determined for the operation of the excess-speed cut-out device.

The above disadvantage is avoided, in accordance with the invention, by causing an auxiliary acceleration speed-regulator to act on the valve or valves of the turbine so that at an angular acceleration $\alpha'$ less than $\alpha$ the regulator immediately causes the closing, at least in part, of the valve or valves of the turbine.

Fig. 2 shows diagrammatically and by way of example a form of embodiment of the acceleration speed-regulator. The device comprises a moving frame $a$ which is able to oscillate about the axis $bb'$ and in which a shaft $e$ carrying a fly-wheel $c$ and a toothed wheel $d$ fixed on the said shaft, can turn about the axis $ff'$. The frame also carries a second toothed wheel $g$ engaging with $d$ and also rotating in the frame about the axis $hh'$. The shaft of the turbine is mechanically connected to a third toothed wheel $i$ which engages with the toothed wheel $g$.

Under steady conditions and at constant speed, the system is in equilibrium and the frame $a$ hangs vertically downwards, but as soon as the turbine accelerates the frame is immediately displaced, by reason of the inertia of the fly wheel $c$, in the direction of rotation of the toothed pinion $i$, during the whole duration of the acceleration. The movements of the frame in the reverse direction are prevented by an abutment member $k$. Finally, by adding an adjustable spring $l$, the displacement of the frame can be limited to take place at a certain value of the acceleration, that is to say at an angle $\alpha'$ (Fig. 1) which is well-defined. Normally, this spring $l$ tends to hold the moving frame in contact with the abutment member $k$.

The greater part of the tachometric speed-control devices actually employed on high-power turbines comprise servo-motors or distribution relays controlled by the driving fluid, the pressure of which is modulated by the tachometer. In order to limit the acceleration of a turbine following a partial or total removal of the load, it will suffice, in accordance with the invention, to set the driving fluid of the servo-motors or the intermediate relays to discharge by the action of the acceleration speed regulator in order to effect a more rapid reduction of the admission of steam or of gas.

Fig. 3 shows by way of example the diagram of the combination of the acceleration-type speed-regulator described above with the oil circuit, which is modulated or controlled by the tachometer speed-regulator. In this figure, there is shown a side view of the frame $a$ and the various members described above. At the lower portion of the frame $a$ there is pivoted a push-rod $m$ which is adapted to open a balanced discharge valve $r$ provided on the conduit $p$ which brings the oil under pressure, which is varied by the tachometer speed regulator, under the piston of the servomotor or motors which control the admission valves of the turbine, or into an intermediate relay, in accordance with known arrangements.

Fig. 3 shows the frame $a$ separated from its abutment $k$ against the pull of the spring $l$ in consequence of an acceleration of the turbine, communicated to the wheel $i$ and having applied to the frame an effort $$F = \text{a constant} \times \frac{dN}{dt}$$

which is greater than the tension setting $F_0$ of the spring $l$. The push-rod $m$ thus causes the opening of the flap-valve $r$ and the pressure of oil falls away sharply in the conduit $p$, thus causing the servomotor $S_m$ to close the admission-valve $V$ of the turbine $T$.

This servomotor operates as follows:

A centrifugal regulator R driven by the turbine is rigidly connected with a blade P, of which it determines the lift $a$ with respect to the fixed seat of an opening provided on the conduit $p$.

A calibrated orifice $o$ supplies, from a constant pressure $P_0$, the tachymetric oil pressure and admits therein a certain flow which the opening $a$ discharges to the open air.

If the speed of rotation of the regulator increases, the blade P descends, $a$ increases and the tachymetric pressure in the conduit $p$ decreases.

This pressure acts on the face of a manometric piston S, against a spring $S_1$ which balances this force, the position of the piston S in its turn via the servomotor $S_m$ of conventional double-acting type controls the opening of the valve V, the lever arms being so determined that the valve V closes when the piston S descends when the tachymetric pressure drops.

There has been added to Fig. 1, by way of example, the curve of variations of speed 2 corresponding to the combined action of the tachometer-regulator and the acceleration-regulator, this latter being set (by the setting of the tension of the spring $l$) to come into action at an acceleration corresponding to a slope $\alpha'$. In consequence of a sharp reduction in load, the curve 2, which represents the speed, first of all increases at the angle $\alpha$ determined by the tachometer regulator, but curves over very rapidly under the action of the acceleration regulator which has immediately caused a more rapid closure of the steam-admission valve or valves.

The action of the acceleration-regulator would continue until the slope of the curve 2, 2' reaches the value $\alpha'$, but the duration of this retarding action may be prolonged beyond that limit by retarding the closure of the oil discharge flap-valve $r$ by means, for example, of an oil dash-pot $s$ which offers no resistance to the opening of the oil discharge valve $r$ by virtue of the presence of the large section flap-valve $s_1$, but opposing a resistance, which is variable by means of the needle valve $t$, to the closure of the valve $r$ (Fig. 3).

In practice, the action of the acceleration regulator has the effect of giving to the evolution of the speed, in consequence of a sharp diminution in load, the shape of the curve 2, 2', the maximum point of which is much lower than the curve of the tachometer-regulator alone; this latter regulator reassumes, furthermore, its mode of normal operation from the moment at which the discharge valve $r$ is effectively closed.

Finally, as a subsidiary feature, the operation of the accelerator-regulator may be artificially set in action by applying to the fly-wheel $c$ a rubbing action which produces the same effect as an acceleration of the turbine; there is thus a possibility of testing during running, by means of a rubbing action of short duration, the correct condition of operation of this regulator and even of stopping the turbine. To this end, a brake B may be provided and combined with the fly-wheel $c$.

It is clear that the tension of the spring $l$ holding the frame $a$ of the acceleration-regulator against the abutment member $k$ will be regulated in such a way that this regulator only comes into action in the case of very large reductions in the load on the turbine, which are liable to cause excessive increases in speed, and not in the case of moderate variations in load, such as normally occur during the course of ordinary operation.

What I claim is:

1. In combination with a prime mover comprising a driving fluid feed conduit and a control valve in said conduit, a regulating device for controlling said valve comprising a governor which is sensitive to the speed of rotation of the prime mover, servo-control means including an oil pressure system for causing said governor to act on at least one admission-valve of said prime mover, an oil discharge valve in said system, said valve being adapted, when opened, to release the pressure in said system thereby closing said admission-valve, adjustable resilient means for urging said oil discharge valve to closing position, an acceleration-regulator adapted to respond to angular acceleration of said prime mover, said acceleration-regulator comprising a fly-wheel driven from said prime mover, connecting means between said acceleration-regulator and said oil discharge valve for urging the latter to opening position upon a predetermined acceleration of said prime-mover, and abutting means for limiting the displacement of said acceleration-regulator upon retardation of said prime mover.

2. Device as claimed in claim 1, further comprising an oil dash-pot associated with the oil discharge valve for retarding return of said valve to closing position, and means for adjusting the time of action of said dash-pot, said means including a needle-valve.

3. Device as claimed in claim 1, further comprising a brake associated with the fly-wheel for manually braking its motion whereby the acceleration-regulator responds as in the case of an acceleration of the prime-mover.

References Cited in the file of this patent

UNITED STATES PATENTS

| | | |
|---|---|---|
| 590,954 | Bayle | Oct. 5, 1897 |
| 1,586,167 | Trotter | May 25, 1926 |
| 1,905,274 | Dunlop | Apr. 25, 1933 |
| 2,302,322 | Howard | Nov. 17, 1942 |
| 2,358,894 | Volet | Sept. 26, 1944 |
| 2,630,815 | Worthing | Mar. 10, 1953 |
| 2,633,830 | McCourty | Apr. 7, 1953 |